United States Patent [19]

Yumoto et al.

[11] Patent Number: 4,767,833

[45] Date of Patent: Aug. 30, 1988

[54] TRANSPARENT, IMPACT-RESISTANT, THERMOPLASTIC RESIN COMPOSITION HAVING EXCELLENT CHEMICAL RESISTANCE AND PROCESS FOR PRODUCING SAME

[75] Inventors: Tsunemasa Yumoto; Yoshio Nakanishi; Kazuki Iwai, all of Yokkaichi; Tadahiko Itoh, Tsu, all of Japan

[73] Assignee: Japan Synthetic Rubber Co., Ltd., Tokyo, Japan

[21] Appl. No.: 911,875

[22] Filed: Sep. 26, 1986

[30] Foreign Application Priority Data

Oct. 9, 1985 [JP] Japan ............................... 60-223648

[51] Int. Cl.$^4$ .................... C08F 257/02; C08F 279/06
[52] U.S. Cl. .................................... 525/193; 525/71; 525/80; 525/83; 525/84; 525/227; 525/310; 525/316; 525/243
[58] Field of Search ..................... 525/193, 310, 71, 80

[56] References Cited

U.S. PATENT DOCUMENTS

| | | | |
|---|---|---|---|
| 3,845,164 | 10/1974 | Goto et al. | 525/310 |
| 3,928,495 | 12/1975 | Dalton | 525/310 |
| 4,334,039 | 6/1982 | Dupre | 525/71 |
| 4,430,478 | 2/1984 | Schmitt et al. | 525/71 |
| 4,520,165 | 5/1985 | Zabrocki et al. | 525/84 |

FOREIGN PATENT DOCUMENTS

| | | | |
|---|---|---|---|
| 3304544 | 8/1984 | Fed. Rep. of Germany | 525/193 |
| 29794/77 | 8/1974 | Japan . | |
| 30314/77 | 1/1976 | Japan . | |
| 1683/83 | 10/1979 | Japan . | |

*Primary Examiner*—Wilbert J. Briggs, Sr.
*Attorney, Agent, or Firm*—Oblon, Fisher, Spivak, McClelland & Maier

[57] ABSTRACT

A thermoplastic resin composition obtained by graft-polymerizing 95 to 50 parts by weight of a monomer mixture comprising a vinyl aromatic compound monomer and an acrylic compound monomer and optionally a vinyl cyanide compound monomer in the presence of 5 to 50 parts by weight of a rubbery substance consisting of styrene-butadiene copolymers, characterized in that the rubbery substance comprises (A) 40 to 80% by weight of a styrene-butadiene copolymer having a number-average particle diameter of at least 0.05 μm and less than 0.2 μm, a gel content of 30 to 100% by weight and a bound styrene content of 10 to 40% by weight and (B) 60 to 20% by weight of a styrene-butadiene copolymer having a number-average particle diameter of 0.2 to 3 μm, a gel content of 10 to 80% by weight and a bound styrene content of 10 to 40% by weight and the total content of the components (A) and (B) in the rubbery substance is at least 80% by weight. Said thermoplastic resin composition is superior in chemical resistance, transparency, impact resistance and product appearance.

19 Claims, No Drawings

TRANSPARENT, IMPACT-RESISTANT, THERMOPLASTIC RESIN COMPOSITION HAVING EXCELLENT CHEMICAL RESISTANCE AND PROCESS FOR PRODUCING SAME

This invention relates to a novel thermoplastic resin composition and to process for the production thereof. More particularly, this invention relates to a transparent thermoplastic resin composition with improved chemical resistance, improved impact resistance and improved product appearance, and to a process for producing said thermoplastic resin composition.

As a transparent, thermoplastic resin composition having excellent impact resistance, rubber-reinforced thermoplastic resin compositions obtained by graft-polymerizing various monomers on a rubbery substance, such as MBS resins (methyl methacrylate-butadiene-styrene resins), transparent ABS resins (acrylonitrile-butadiene-styrene resins), transparent HIPS resins (high impact polystyrene resins) and the like, have heretofore been known and widely used as a molding material for injection molding, extrusion molding, etc.

As to these resins, proposals for improving their transparency have been made, for example, (1) making smaller the particle diameter of a rubbery substance, (2) making smaller the thickness of the rubbery substance particles on which monomers are to be graft-polymerized and (3) making identical the refractive index of the rubbery substance as a trunk and the refractive index of a copolymer formed from the monomers to be graft-polymerized.

With the recent diversification in use of thermoplastic resin compositions, a demand for an impact-resistant, thermoplastic resin composition superior in chemical resistance, transparency and product appearance has become strong.

However, such conventional thermoplastic resin compositions can hardly be improved in chemical resistance while retaining their excellent transparency and product appearance.

For instance, when the amount of acrylonitrile to be graft-polymerized is increased for improving the chemical resistance, the thermal discoloration of the resulting resin becomes great and the product appearance of the resin is sacrificed. Also, when the molecular weight of the graft portion formed by graft-polymerizing the monomers is increased the moldability of the resin obtained is deteriorated, and hence, the molding must be effected at an elevated resin temperature, resulting in thermal discoloration and deterioration and a sacrificed product appearance of the resin.

This invention has been made under the abovementioned technical background of the prior art and aims at providing an impact-resistant, thermoplastic resin composition superior in chemical resistance, transparency and product appearance.

The present inventors have achieved the above object by replacing the rubbery substance in the conventional impact-resistant, thermoplastic resins by a rubbery substance having a specific composition.

According to this invention, there is provided a thermoplastic resin composition obtained by graft-polymerizing 95 to 50 parts by weight of a monomer mixture comprising a vinyl aromatic compound monomer and an acrylic compound monomer and/or a vinyl cyanide compound monomer in the presence of 5 to 50 parts by weight of a rubbery substance consisting of styrene-butadiene copolymers, characterized in that the rubbery substance comprises (A) 40 to 80% by weight of a styrene-butadiene copolymer having a number-average particle diameter of at least 0.05 μm and less than 0.2 μm, a gel content of 30 to 100% by weight and a bound styrene content of 10 to 40% by weight [hereinafter, said styrene-butadiene copolymer is, in some cases, referred to as the component (A)] and (B) 60 to 20% by weight of a styrene-butadiene copolymer having a number-average particle diameter of 0.2 to 3 μm, a gel content of 10 to 80% by weight and a bound styrene content of 10 to 40% by weight [hereinafter, said styrene-butadiene copolymer is, in some cases, referred to as the component (B)] and the total content of the components (A) and (B) in the rubbery substance is at least 80% by weight, and a process for producing said thermoplastic resin composition is also provided.

The styrene-butadiene copolymers used in this invention may be not only copolymers of styrene and butadiene but also copolymers of styrene, butadiene and 5 mole % or less, preferably 3 mole % or less of at least one monomer selected from the grafting monomers used in this invention and mentioned in detail hereinafter, namely, vinyl aromatic compound monomers, acrylic compound monomers and vinyl cyanide compound monomers.

The component (A) is required to have a number-average particle diameter of at least 0.05 μm and less than 0.2 μm. The number-average particle diameter is preferably 0.07 to 0.15 μm. When the number-average particle diameter is less than 0.05 μm, the resin composition obtained has excellent transparency but low chemical resistance and impact resistance. When the number-average particle diameter is 0.2 μm or more, the resin composition has improved chemical resistance but low transparency.

The component (A) is required to have a gel content of 30 to 100% by weight. The gel content is preferably 50 to 100% by weight. When the gel content is less than 30% by weight, the resin composition obtained is inferior in chemical resistance and product appearance.

The component (A) is required to have a bound styrene content of 10 to 40% by weight. The bound styrene content is preferably 20 to 30% by weight. When the bound styrene content is less than 10% by weight, the resin composition obtained is inferior in chemical resistance. When the bound styrene content exceeds 40% by weight, the resin composition has excellent chemical resistance but low impact resistance.

The component (B) is required to have a number-average particle diameter of 0.2 to 3 μm. The number average particle diameter is preferably 0.3 to 1.5 μm. When the number-average particle diameter is less than 0.2 μm, the resin composition obtained has excellent transparency but low chemical resistance and impact resistance. When the number-average particle diameter exceeds 3 μm, the resin composition has improved chemical resistance but low transparency.

The component (B) is required to have a gel content of 10 to 80% by weight. The gel content is preferably 10 to 60% by weight. When the gel content is less than 10% by weight, the resin composition obtained is inferior in chemical resistance and product appearance. When the gel content exceeds 80% by weight, the resin composition has excellent chemical resistance and product appearance but low impact resistance.

The component (B) is required to have a bound styrene content of 10 to 40% by weight. The bound styrene content is preferably 20 to 30% by weight. When the bound styrene content is less than 10% by weight, the resin composition obtained is inferior in chemical resistance. When the bound styrene content exceeds 40% by weight, the resin composition has excellent chemical resistance but low impact resistance.

The rubbery substance of this invention contains the component (A) and the component (B) in such a proportion that the component (A) is 40 to 80% by weight, preferably 50 to 70% by weight and the component (B) is 60 to 20% by weight, preferably 50 to 30% by weight.

When the proportion of the component (A) is less than 40% by weight, the resin composition obtained has excellent chemical resistance but low transparency. When the proportion exceeds 80% by weight, the resin composition has not only low chemical resistance but also inferior impact resistance and product appearance.

The total content of the components (A) and (B) in the rubbery substance of this invention is required to be at least 80% by weight. The said total content is preferably 100% by weight. When the total content is less than 80% by weight, it is difficult to obtain a resin composition having excellent impact resistance, transparency and product appearance as aimed at by this invention.

In addition, the ratio of the number-average particle diameter of the component (A) to the number-average particle diameter of the component (B) is preferably 2 or more and more preferably 3 to 10, and the ratio of the gel content of the component (A) to the gel content of the component (B) is preferably 1 or more and more preferably 1.5 to 10.

The styrene-butadiene copolymers meeting the above-mentioned requirements for the components (A) and (B) can usually be produced by emulsion-polymerizing styrene and butadiene according to an ordinary method. In this case, the control of the number-average particle diameter can be made by, for example, a method of adjusting, as required, the monomer/polymerization water ratio, the emulsifier amount, the electrolyte amount, etc. during polymerization. The control of the gel content can be made by, for example, a generally known method, such as changing the reaction, temperature or the like or a method of copolymerizing a cross-linkable monomer such a divinylbenzene, diallyl maleate, diallyl fumarate, diallyl adipate, allyl acrylate, ethylene glycol dimethacrylate or the like. The control of the bound styrene content can easily be made by changing the amount of styrene to be fed in the emulsion-polymerized. The polymerization temperature is usually 40° to 100° C., preferably 50° to 90° C.

The component (A) can be obtained according to, for example, the following production process:

A process comprising feeding styrene and butadiene in the presence of an emulsifier such as disproportionated potassium rosinate or the like, adding an initiator such as potassium persulfate or the like and copolymerizing said monomers at a temperature of about 50° C. (a polymerization conversion of 90% or more can be obtained).

The component (B) can be obtained according to, for example, the following production process:

A process comprising feeding styrene, butadiene and an appropriate amount of an electrolyte such as sodium sulfate or the like in the presence of an emulsifier such as disproportionated potassium rosinate or the like, adding an initiator such as potassium persulfate or the like and copolymerizing said monomers at a temperature of about 50° C. (a polymerization conversion of 90% or more can be obtained).

In this invention, the monomers to be graft-polymerized on the rubbery substance comprising the components (A) and (B) mentioned above are a monomer mixture comprising a vinyl aromatic compound monomer and an acrylic compound monomer and/or a vinyl cyanide compound monomer.

The vinyl aromatic compound monomer includes, for example, styrene, α-methylstyrene, p-methylstyrene, m-methylstyrene, o-methylstyrene, p-t-butylstyrene, dimethylstyrene, vinylnaphthalene, vinyltoluene, halogenated styrenes, p-cyanostyrene, p-methoxystyrene, etc. These monomers can be used alone or in admixture of two or more. Of these, styrene or a combination of styrene and α-methylstyrene is preferred.

The acrylic compound monomer includes acrylic acid, methacrylic acid, methyl acrylate, methyl methacrylate, ethyl acrylate, ethyl methacrylate, n-butyl acrylate, n-butyl methacrylate, 2-ethylhexyl acrylate, n-hexyl acrylate, etc. These acrylic compound monomers can be used alone or in combination of two or more. Methyl methacrylate is particularly preferred.

The vinyl cyanide compound monomer includes, for example, acrylonitrile, methacrylonitrile, vinylidene cyanide, etc. Acrylonitrile is preferred. These vinyl cyanide compound monomers can be used alone or in combination of two or more.

These monomers are usually used in such a proportion that the molar ratio of the vinyl aromatic compound monomer/the acrylic compound monomer/the vinyl cyanide compound monomer is 20 to 55/30 to 70/0 to 35, preferably 25 to 55/35 to 70/0 to 20.

These monomers can be used, if desired, in combination with about 20 mole % or less, preferably 10 mole % or less of other monomers such as N-phenylmaleimide, N-o-chlorophenylmaleimide, N-cyclohexylmaleimide, N-o-methylphenylmaleimide, N-methylmaleimide, N-o-methoxyphenylmaleimide, glutarimide, maleic anhydride and the like.

In this invention, the rubbery substance comprising the components (A) and (B) and the monomer mixture are used in such a proportion that the amount of the rubbery substance is 5 to 50 parts by weight, preferably 15 to 40 parts by weight and the amount of the monomer mixture is 95 to 50 parts by weight, preferably 85 to 60 parts by weight.

When the amount of the rubbery substance in the resin composition of this invention is less than 5 parts by weight, the resin composition obtained has insufficient impact resistance. When the amount exceeds 50 parts by weight, the low transparency of the resin composition becomes low.

In this invention, the difference in refractive index between the rubbery substance and the copolymer of the monomers grafted thereon is preferably 0.005 or less, more preferably 0.003 or less. It is desirable that the rubbery substance be combined with the monomer mixture so that said difference in refractive index falls within the above target range. When the difference in refractive index exceeds 0.005, a light refracts at the interface between the rubbery substance and the copolymer of the monomers grafted and, in some cases, the transparency of the resin composition obtained becomes inferior.

The thermoplastic resin composition of this invention can easily be produced according to a graft-polymerization which is conventionally conducted.

The graft-polymerization can be conducted according to emulsion polymerization, suspension polymerization, bulk polymerization or a combination of two or more of them. Of these, emulsion polymerization is particularly preferred.

For instance, a monomer mixture as mentioned above is added to a latex comprising the components (A) and (B) and then graft-polymerized in a conventional manner.

In this case, the addition of the monomer mixture can be conducted by adding the whole amount of the mixture at one time at the start of the graft-polymerization, or by adding it in two or more portions, or by adding a part or the whole of the mixture continuously.

In the graft-polymerization, an initiator is used, and this initiator may be an organic hydroperoxide such as cumene hydroperoxide, diisopropylbenzene hydroperoxide, p-menthane hydroperoxide or the like; a redox initiator using, as the reducing agent, a sugar-containing pyrophosphoric acid recipe, a sulfoxylate recipe or the like; a persulfate such as potassium persulfate, ammonium persulfate or the like; or a radical initiator such as azobisisobutyronitrile, benzoyl peroxide, lauroyl peroxide or the like.

The amount of the graft polymerization initiator used is not critical. It may ordinarily be the same as the amount used in the production of styrene polymers; however, it is preferable to make the amount as small as possible in such a range that the polymerization conversion is not reduced.

In the graft-polymerization, a molecular weight regulator may be used, for example, a mercaptan such as n-octylmercaptan, n-dodecylmercaptan, t-dodecylmercaptan, mercaptoethanol or the like or a halogenated hydrocarbon such as chloroform, carbon tetrachloride or the like.

Also, in the graft-polymerization, an emulsifier may be used, for example, a rosinate such as potassium rosinate, sodium rosinate or the like; an alkali metal salt of fatty acid such as potassium oleate, sodium oleate, potassium laurate, sodium laurate, sodium stearate, potassium stearate or the like; a salt of sulfuric acid ester of aliphatic alcohol such as sodium lauryl sulfate or the like; or an alkylarylsulfonate such as sodium dodecylbenzenesulfonate or the like. The resin composition thus produced according to the graft-polymerization is recovered as a solid resin composition according to a conventional polymer recovery method, that is, by coagulating, water-washing and drying.

The resin composition of this invention may be used as such, or may also be appropriately blended with a (co)polymer of at least one compound selected from vinyl aromatic compounds, acrylic compounds and vinyl cyanide compounds, particularly with a copolymer of a vinyl aromatic compound and an acrylic compound. The resin composition of this invention may further be blended, if necessary, with about 50% by weight or less, preferably about 5 to 30% by weight, of a commercially available resin such as an ABS resin, an MBS resin, a HIPS resin or the like. It may further have added thereto various additives which are conventionally used, such as a stabilizer, a lubricant, an antistatic agent and the like. The blending of the resin composition of this invention with other resins and additives is carried out by means of a Henschel mixer, an extruder, a hot roll, a Banbury mixer or the like.

The resin composition of this invention thus obtained can be processed into molded articles useful in practice according to a conventional molding method such as extrusion molding, injection molding or the like.

The thermoplastic resin composition of this invention has an excellent balance of chemical resistance, transparency, product appearance and impact resistance. Utilizing these characteristics, it can be applied widely in uses such as transparent parts used in domestic electrification appliances, office automation equipments, automobiles, game equipments, etc.

This invention will be explained more specifically below referring to Examples.

In the Examples, % and parts are % by weight and parts by weight, respectively, unless otherwise specified.

In the Examples, evaluation of various properties were conducted as follows:

(a) Particle diameter: Measured by means of an electron microscope and indicated as number average particle diameter.

(b) Gel content: Weight % of the insolubles obtained by coagulating and drying a rubber latex, dissolving the resulting solid in toluene at room temperature (20° C.) for 20 hours, and filtering the resulting solution through a 200 mesh wire net.

(c) Bound styrene content: Measured by coagulating and drying a rubber latex, and subjecting the resulting solid to pyrolytic gas chromatography.

(d) Izod impact strength: Measured according to ASTM D 256.

(e) Rockwell hardness. Measured according to ASTM D 785.

(f) Melt flow rate: Measured according to JIS K 7210 (220° C., 10 kg).

(g) Haze value: Measured according to ASTM D 1003.

(h) Surface gloss: Measured according to ASTM D 523.

(i) Chemical resistance: Crack resistance in ethanol (A sample was immersed in ethanol at 23° C. for 14 days and cracking of the sample was observed. No crack and no crazing was rated as O; crazing was rated as Δ; and crack was rated as ×.)

(j) Refractive index: Measured according to ASTM D 542.

EXAMPLE 1

With the following feed formulation, a monomer mixture was graft-polymerized on a styrene-butadiene copolymer (SBR) latex:

| Feed formulation | |
|---|---|
| SBR latex (A) (particle diameter distribution: 0.07 to 0.15 μm, number-average particle diameter: 0.09 μm, gel content: 80% and bound styrene content: 23%): | 12.0 parts |
| SBR latex (B) (particle diameter distribution: 0.3 to 1.5 μm (90% of the particles); number-average particle diameter: 0.7 μm; gel content: 20% and bound styrene content: 23%): | 8.0 parts |
| Styrene: | 32.0 parts |
| Methyl methacrylate: | 43.0 parts |
| Acrylonitrile: | 5.0 parts |
| t-Dodecylmercaptan: | 0.3 part |
| Potassium persulfate: | 0.5 part |

-continued

| Feed formulation | |
|---|---|
| Potassium oleate: | 0.5 part |
| Pure water: | 200 parts |

In the graft-polymerization, styrene, methyl methacrylate, acrylontrile and t-dodecylmercaptan were mixed beforehand, and this mixture was added to a system in a reactor containing the SBR latex (A), the SBR latex (B), potassium persulfate, potassium oleate and pure water, over 4 hours with stirring, whereby the monomers were emulsion-graft-polymerized at 70° C.

The polymerization yield was 98%. The graft copolymer formed was coagulated in a hot water bath containing calcium chloride, water-washed and dried to obtain a graft copolymer powder. 100 Parts of this graft copolymer powder and 0.5 part of ethylene-bissteara-mide were mixed uniformly by means of a Henschel mixer. The resulting mixture was pelletized by an extruder. Using the resulting pellets as an evaluation sample, various evaluation tests were conducted. The results are shown in Table 1.

EXAMPLE 2

An evaluation sample was prepared and evalutated in the same manner as in Example 1, except that the monomers were used with the feed formulation shown in Table 1. The results are shown in Table 1.

COMPARATIVE EXAMPLES 1 TO 4

Evaluation samples were prepared and evaluated in the same manner as in Example 1, except that the SBR latexes having the properties shown in Table 1 and the monomers were used with the feed formulation shown in Table 1. The results are shown in Table 1.

EXAMPLE 3

Graft-polymerization was conducted using the following feed formulation:

| Feed formulation | |
|---|---|
| SBR latex (A) (particle diameter distribution: 0.07 to 0.15 μm, number-average particle diameter: 0.09 μm, gel content: 80% and bound styrene content: 23%): | 24.0 parts |
| SBR latex (B) (particle diameter distribution: 0.3 to 1.5 μm (90% of the particles), number-average particle diameter: 0.7 μm, gel content: 20% and bound styrene content: 23%): | 16.0 parts |
| Styrene: | 23.2 parts |
| Methyl methacrylate: | 36.8 parts |
| t-Dodecylmercaptan: | 0.3 part |
| Potassium persulfate: | 0.5 part |
| Potassium oleate: | 0.4 part |
| Pure water: | 200 parts |

The polymerization procedure and the recovery procedure for the graft copolymer formed were the same as those in Example 1. The polymerization yield was 97%. 50 Parts of the graft copolymer powder obtained, 50 parts of a commercially available styrene-methyl methacrylate copolymer (JSR MS350) manufactured by Japan Synthetic Rubber Co., Ltd. and 0.5 part of ethylene-bisstearamide were mixed uniformly by means of a Henschel mixer. The resulting mixture was pelletized by an extruder to prepare an evaluation sample. The results are shown in Table 1.

As is obvious from Table 1, the thermoplastic resin composition of this invention, even when used as a blend with a copolymer of the same monomers as used in said thermoplastic resin composition, has an excellent balance of chemical resistance, transparency, product appearance and impact resistance.

COMPARATIVE EXAMPLE 5

An evaluation sample was prepared and evaluated in the same manner as in Example 3, except that the SBR latexes having the properties shown in Table 1 was used with the feed formulation shown in Table 1. The results are shown in Table 1.

EXAMPLE 4

An evaluation sample was prepared and evaluated in the same manner as in Example 1, except that the monomers were used with the feed formulation shown in Table 1. The results are shown in Table 1.

COMPARATIVE EXAMPLE 6

An evaluation sample was prepared and evaluated in the same manner as in Example 1, except that the SBR latexes having the properties shown in Table 1 and the monomers were used with the feed formulation shown in Table 1. The results are shown in Table 1.

COMPARATIVE EXAMPLES 7 TO 10

Evaluation samples were prepared and evaluated in the same manner as in Example 1, except that the SBR latexes having the properties shown in Table 1 and the monomers were used with the formulations shown in Table 1. The results are shown in Table 1.

As is obvious from Table 1, the thermoplastic resin composition of this invention had an excellent balance of chemical resistance, product appearance and impact resistance.

EXAMPLES 5 TO 14 AND COMPARATIVE EXAMPLES 11 TO 19

Evaluation samples were prepared and evaluated by repeating the procedure of Example 1, except that the SBR latexes (A) and (B), their ratio and the weight ratio of the latexes (A) and (B) to the monomers were changed as shown in Table 1. The results are shown in Table 1.

As is obvious from these Examples and Comparative Examples, it is difficult to obtain a resin composition superior in both of transparency and chemical resistance when the gel content or bound styrene content of the SBR latex (A) or (B) is outside the scope of this invention. When the weight ratio of the SBR latexes (A) and (B) to the monomers is outside the scope of this invention, the resin composition obtained is inferior in strength or hardness. When the SBR latex (A)/the SBR latex (B) is outside the scope of this invention, the resin composition obtained has insufficient transparency, strength or chemical resistance.

TABLE 1

| | Example 1 | Example 2 | Comparative Example 1 | Comparative Example 2 | Comparative Example 3 | Comparative Example 4 | Comparative Example 5 | Example 3 | Example 4 | Comparative Example 6 | Comparative Example 7 | Comparative Example 8 |
|---|---|---|---|---|---|---|---|---|---|---|---|---|
| Properties of SBR latex (A) | | | | | | | | | | | | |
| Particle diameters (μm) | 0.07–0.15 | 0.07–0.15 | 0.07–0.15 | 0.07–0.15 | 0.07–0.15 | 0.07–0.15 | 0.07–0.15 | 0.07–0.15 | 0.07–0.15 | 0.07–0.15 | — | 0.2–0.5 |
| Number-average particle diameter (μm) | 0.09 | 0.09 | 0.09 | 0.09 | 0.09 | 0.09 | 0.09 | 0.09 | 0.09 | 0.09 | — | 0.3 |
| Gel content (%) | 80 | 80 | 80 | 5 | 80 | 80 | 5 | 80 | 80 | 5 | — | 80 |
| Bound styrene content (%) | 23 | 23 | 23 | 23 | 23 | 23 | 23 | 23 | 23 | 23 | — | 23 |
| Properties of SBR latex (B) | | | | | | | | | | | | |
| Particle diameters (μm) | 0.3–1.5 | 0.3–1.5 | 0.08–0.16 | 0.3–1.5 | 0.3–1.5 | 0.3–1.5 | 0.3–1.5 | 0.3–1.5 | 0.3–1.5 | 0.3–1.5 | 0.3–1.5 | 0.3–1.5 |
| Number-average particle diameter (μm) | 0.7 | 0.7 | 0.1 | 0.7 | 0.7 | 0.7 | 0.7 | 0.7 | 0.7 | 0.7 | 0.7 | 0.7 |
| Gel content (%) | 20 | 20 | 20 | 2 | 20 | 20 | 5 | 20 | 20 | 2 | 20 | 20 |
| Bound styrene content (%) | 23 | 23 | 23 | 23 | 5 | 23 | 23 | 23 | 23 | 23 | 23 | 23 |
| Feed formulation (parts) | | | | | | | | | | | | |
| SBR latex (A) | 12.0 | 12.0 | 12.0 | 12.0 | 12.0 | 18.0 | 24.0 | 24.0 | 12.0 | 12.0 | 0 | 12.0 |
| SBR latex (B) | 8.0 | 8.0 | 8.0 | 8.0 | 8.0 | 2.0 | 16.0 | 16.0 | 8.0 | 8.0 | 20.0 | 8.0 |
| Styrene | 32.0 | 35.0 | 32.0 | 32.0 | 21.0 | 32.0 | 23.2 | 23.2 | 46.0 | 46.0 | 32.0 | 32.0 |
| Methyl methacrylate | 43.0 | 45.0 | 43.0 | 43.0 | 59.0 | 43.0 | 36.8 | 36.8 | 29.0 | 29.0 | 43.0 | 43.0 |
| Acrylonitrile | 5.0 | — | 5.0 | 5.0 | — | 5.0 | — | — | 5.0 | 5.0 | 5.0 | 5.0 |
| (A)/(B) | 60/40 | 60/40 | 60/40 | 60/40 | 60/40 | 90/10 | 60/40 | 60/40 | 60/40 | 60/40 | 0/100 | 60/40 |
| [(A) + (B)]/monomers | 20/80 | 20/80 | 20/80 | 20/80 | 20/80 | 20/80 | 40/60 | 40/60 | 20/80 | 20/80 | 20/80 | 20/80 |
| Graft copolymer/JSR MS350* | — | — | — | — | — | — | 50/50 | 50/50 | — | — | — | — |
| Evaluation results | | | | | | | | | | | | |
| Izod strength (kg·cm/cm) | 20 | 15 | 5 | 21 | 14 | 6 | 16 | 14 | 22 | 24 | 17 | 24 |
| Rockwell hardness (R scale) | 106 | 105 | 106 | 105 | 106 | 106 | 105 | 105 | 105 | 105 | 104 | 105 |
| Melt flow rate (g/10 min) | 16 | 18 | 10 | 18 | 13 | 9 | 18 | 17 | 15 | 19 | 19 | 17 |
| Haze value (%) | 4 | 4 | 5 | 19 | 4 | 4 | 21 | 5 | 89 | 92 | 19 | 10 |
| Surface gloss (%) | 135 | 123 | 112 | 76 | 128 | 103 | 68 | 121 | 92 | 57 | 98 | 129 |
| Chemical resistance | O | O | Δ | X | X | Δ | X | O | O | Δ | O | O |
| Refractive index | | | | | | | | | | | | |
| SBR latex (A) | 1.535 | 1.535 | 1.535 | 1.535 | 1.522 | 1.535 | 1.535 | 1.535 | 1.535 | 1.535 | — | 1.535 |
| SBR latex (B) | 1.535 | 1.536 | 1.535 | 1.535 | 1.522 | 1.535 | 1.535 | 1.535 | 1.552 | 1.552 | 1.535 | 1.535 |
| Copolymer of monomer mixture | — | — | — | — | 1.519 | — | 1.539 | 1.539 | — | — | 1.535 | 1.535 |
| JSR MS350 | — | — | — | — | — | — | — | — | — | — | — | — |

| | Comparative Example 9 | Comparative Example 10 | Example 5 | Example 6 | Example 7 | Example 8 | Example 9 | Example 10 | Comparative Example 11 | Comparative Example 12 | Comparative Example 13 | Comparative Example 14 |
|---|---|---|---|---|---|---|---|---|---|---|---|---|
| Properties of SBR latex (A) | | | | | | | | | | | | |
| Particle diameters (μm) | 0.07–0.15 | 0.07–0.15 | — | — | — | — | — | — | — | — | — | — |
| Number-average particle diameter (μm) | 0.09 | 0.09 | 0.15 | 0.09 | 0.09 | 0.09 | 0.09 | 0.09 | 0.09 | 0.09 | 0.09 | 0.09 |
| Gel content (%) | 80 | 80 | 80 | 80 | 40 | 80 | 80 | 80 | 80 | 80 | 80 | 80 |
| Bound styrene content (%) | 50 | 23 | 23 | 23 | 23 | 23 | 23 | 23 | 23 | 23 | 23 | 23 |
| Properties of SBR latex (B) | | | | | | | | | | | | |
| Particle diameters (μm) | 0.3–1.5 | 3.0–6.0 | — | — | — | — | — | — | — | — | — | — |
| Number-average particle diameter (μm) | 0.7 | 4.0 | 0.7 | 1.5 | 0.7 | 0.7 | 0.7 | 0.7 | 0.7 | 0.7 | 0.7 | 0.7 |
| Gel content (%) | 20 | 20 | 80 | 20 | 20 | 60 | 20 | 20 | 20 | 20 | 20 | 90 |
| Bound styrene content (%) | 50 | 23 | 23 | 23 | 23 | 23 | 23 | 23 | 23 | 23 | 23 | 23 |
| Feed formulation (parts) | | | | | | | | | | | | |
| SBR latex (A) | 12.0 | 12.0 | 12.0 | 12.0 | 12.0 | 12.0 | 10.0 | 14.0 | 1.8 | 36.0 | 12.0 | 12.0 |
| SBR latex (B) | 8.0 | 8.0 | 8.0 | 8.0 | 8.0 | 8.0 | 10.0 | 6.0 | 1.2 | 24.0 | 8.0 | 8.0 |

TABLE 1-continued

Upper block:

| | | | | | | | | | Comparative Example 15 | Comparative Example 16 | Comparative Example 17 | Comparative Example 18 | Example 11 | Example 12 | Comparative Example 19 | Example 13 | Example 14 |
|---|---|---|---|---|---|---|---|---|---|---|---|---|---|---|---|---|---|
| Styrene | 50.0 | 32.0 | 32.0 | 32.0 | 32.0 | 32.0 | 32.0 | 38.8 | 32.0 | 16.0 | 32.0 | 32.0 | 32.0 |
| Methyl methacrylate | 30.0 | 43.0 | 43.0 | 43.0 | 43.0 | 43.0 | 43.0 | 52.1 | 43.0 | 21.5 | 43.0 | 43.0 | 43.0 |
| Acrylonitrile | — | 5.0 | 5.0 | 5.0 | 5.0 | 5.0 | 5.0 | 6.1 | 5.0 | 2.5 | 5.0 | 5.0 | 5.0 |
| (A)/(B) | 60/40 | 60/40 | 60/40 | 60/40 | 60/40 | 50/50 | 70/30 | 60/40 | 60/40 | 60/40 | 60/40 | 60/40 | 60/40 |
| [(A) + (B)]/monomers | 20/80 | 20/80 | 20/80 | 20/80 | 20/80 | 20/80 | 20/80 | 3/97 | 20/80 | 60/40 | 20/80 | 20/80 | 20/80 |
| Graft copolymer/JSR MS350* | — | — | — | — | — | — | — | — | — | — | — | — | — |
| Evaluation results | | | | | | | | | | | | | |
| Izod strength (kg·cm/cm) | 5 | 25 | 22 | 21 | 14 | 23 | 13 | 2 | — | NB** | 21 | — | 9 |
| Rockwell hardness (R scale) | 110 | 104 | 106 | 105 | 106 | 105 | 106 | 123 | — | — | 105 | — | 106 |
| Melt flow rate (g/10 min) | 19 | 18 | 17 | 18 | 16 | 17 | 13 | 32 | 12 | 12 | 17 | — | 15 |
| Haze value (%) | 4 | 10 | 6 | 7 | 7 | 7 | 4 | 2 | 10 | 10 | 17 | — | 10 |
| Surface gloss (%) | 127 | 112 | 131 | 119 | 135 | 125 | 111 | 125 | 108 | 108 | 85 | — | 133 |
| Chemical resistance | O | △ | O | O | O | O | O | O | O | O | △ | — | O |
| Refractive index | | | | | | | | | | | | | |
| SBR latex (A) | 1.555 | 1.535 | 1.535 | 1.535 | 1.535 | 1.535 | 1.535 | 1.535 | 1.535 | 1.535 | 1.535 | 1.529 | 1.535 |
| SBR latex (B) | 1.556 | 1.535 | 1.535 | 1.535 | 1.535 | 1.535 | 1.535 | 1.535 | 1.535 | 1.535 | 1.535 | 1.529 | 1.535 |
| Copolymer of monomer mixture | 1.555 | 1.535 | 1.535 | 1.535 | 1.535 | 1.535 | 1.535 | 1.535 | 1.535 | 1.535 | 1.535 | 1.529 | 1.535 |

Lower block:

| | Comparative Example 15 | Comparative Example 16 | Comparative Example 17 | Comparative Example 18 | Example 11 | Example 12 | Comparative Example 19 | Example 13 | Example 14 |
|---|---|---|---|---|---|---|---|---|---|
| Properties of SBR latex (A) | | | | | | | | | |
| Particle diameters (μm) | — | — | — | — | 0.16 | 0.16 | 0.16 | 0.07 | 0.09 |
| Number-average particle diameter (μm) | 0.09 | 0.09 | 0.09 | 0.09 | 90 | 90 | 88 | 80 | 80 |
| Gel content (%) | 80 | 80 | 80 | 80 | 23 | 23 | 4 | 19 | 19 |
| Bound styrene content (%) | 5 | 23 | 23 | 23 | | | | | |
| Properties of SBR latex (B) | | | | | | | | | |
| Particle diameters (μm) | — | — | — | — | 1.2 | 1.2 | 1.2 | — | — |
| Number-average particle diameter (μm) | 0.7 | 0.7 | 0.7 | 0.7 | 70 | 70 | 70 | 0.7 | 0.7 |
| Gel content (%) | 20 | 20 | 20 | 20 | 23 | 23 | 23 | 20 | 20 |
| Bound styrene content (%) | 23 | 5 | 23 | 23 | | | | 19 | 19 |
| Feed formulation (parts) | | | | | | | | | |
| SBR latex (A) | 12.0 | 12.0 | 6.0 | 20.0 | 8.0 | 8.0 | 10.0 | 12.0 | 12.0 |
| SBR latex (B) | 8.0 | 8.0 | 14.0 | 0 | 3.0 | 3.0 | 1.0 | 8.0 | 8.0 |
| Styrene | 32.0 | 32.0 | 32.0 | 32.0 | 67.0 | 36.0 | 67.0 | 27.5 | 27.5 |
| Methyl methacrylate | 43.0 | 43.0 | 43.0 | 43.0 | 22.0 | 48.0 | 22.0 | 47.5 | 47.5 |
| Acrylonitrile | 5.0 | 5.0 | 5.0 | 5.0 | 22.0 | 5.0 | 22.0 | 5.0 | 5.0 |
| (A)/(B) | 60/40 | 60/40 | 30/70 | 100/0 | 73/27 | 73/27 | 91/9 | 60/40 | 60/40 |
| [(A) + (B)]/monomers | 20/80 | 20/80 | 20/80 | 20/80 | 11/89 | 11/89 | 11/89 | 20/80 | 20/80 |
| Graft copolymer/JSR MS350* | — | — | — | — | — | — | — | — | — |
| Evaluation results | | | | | | | | | |
| Izod strength (kg·cm/cm) | 22 | 21 | 15 | 4 | 9 | 8 | 3 | 17 | 18 |
| Rockwell hardness (R scale) | 106 | 106 | 106 | 107 | 115 | 115 | 115 | 105 | 105 |
| Melt flow rate (g/10 min) | 16 | 17 | 17 | 11 | 18 | 19 | 17 | 17 | 18 |
| Haze value (%) | 7 | 97 | 10 | 15 | Opaque | 5 | Opaque | 4 | 4 |
| Surface gloss (%) | 82 | 129 | 121 | 82 | 91 | 118 | 89 | 121 | 125 |
| Chemical resistance | △ | △ | O | △ | O | O | O | O | O |
| Refractive index | | | | | | | | | |
| SBR latex (A) | 1.522 | 1.535 | 1.535 | 1.535 | 1.535 | 1.535 | 1.518 | 1.529 | 1.529 |
| SBR latex (B) | 1.535 | 1.522 | 1.535 | 1.535 | 1.568 | 1.535 | 1.535 | 1.529 | 1.529 |
| Copolymer of monomer mixture | 1.535 | 1.535 | 1.535 | 1.535 | 1.568 | 1.535 | 1.568 | 1.529 | 1.529 |
| JSR MS350 | — | — | — | — | — | — | — | — | — |

Note:
*JSR MS350 refers to a styrene-methyl methacrylate copolymer (styrene content: 45% by weight, methyl methacrylate content: 55% by weight).
**NB means "not broken".

What is claimed is:

1. A thermoplastic resin composition obtained by graft-polymerizing 95 to 50 parts by weight of a monomer mixture consisting essentially of styrene or a styrene-α-methyl styrene mixture and methyl methacrylate in the presence of 5 to 50 parts by weight of a rubbery substance consisting of styrene-butadiene copolymers, wherein said rubbery substance comprises (A) 40 to 80% by weight of a styrene-butadiene copolymer having a number-average particle diameter of at least 0.05 and less than 0.2 μm, a gel content of 30–100% by weight and a bound styrene content of 10–40% by weight and (B) 60–20% by weight of a styrene-butadiene copolymer having a number-average particle diameter of 0.2–3 μm, a gel content of 10–80% by weight and a bound styrene content of 10–40% by weight; the total content of the components (A) and (B) in the rubbery substance is at least 80% by weight, and the difference between the refractive index of the rubbery substance and the refractive index of the copolymer of the monomer mixture grafted on the rubbery substance is 0.005 or less.

2. A thermoplastic resin composition according to claim 1, wherein the component (A) has a number-average particle diameter of 0.07 to 0.15 μm.

3. A thermoplastic resin composition according to claim 1, wherein the component (A) has a gel content of 50 to 100% by weight.

4. A thermoplastic resin composition according to claim 1, wherein the component (A) has a bound styrene content of 20 to 30% by weight.

5. A thermoplastic resin composition according to claim 1, wherein the component (B) has a number-average particle diameter of 0.3 to 1.5 μm.

6. A thermoplastic resin composition according to claim 1, wherein the component (B) has a gel content of 10 to 60% by weight.

7. A thermoplastic resin composition according to claim 1, wherein the component (B) has a bound styrene content of 20 to 30% by weight.

8. A thermoplastic resin composition according to claim 1, wherein the rubbery substance comprises 50 to 70% by weight of the component (A) and 50 to 30% by weight of the component (B).

9. A thermoplastic resin composition according to claim 1, wherein the rubbery substance consists of the component (A) and the component (B).

10. A thermoplastic resin composition according to claim 1, wherein the amount of the rubbery substance is 15 to 40 parts by weight and the amount of the monomer mixture is 85 to 60 parts by weight.

11. A thermoplastic resin composition according to claim 1, wherein the monomer mixture consists of styrene and methyl methacrylate.

12. A thermoplastic resin composition according to claim 1, wherein the molar ratio of the styrene or styrene-α-methyl styrene mixture to methyl methacrylate is 20-55/30-70.

13. A thermoplastic resin composition according to claim 1, wherein the molar ratio of the styrene or styrene-α-methyl styrene mixture to methyl methacryalte is 25-55/35-70.

14. A process for producing a thermoplastic resin composition which comprises graft-polymerizing 95 to 50 parts by weight of a monomer mixture consisting essentially of styrene or a styrene-α-methylstyrene mixture and methyl methacrylate in the presence of 5 to 50 parts by weight of a rubbery substance consisting of styrene-butadiene copolymers, wherein the rubbery substance comprises (A) 40–80% by weight of a styrene-butadiene copolymer having a number-average particle diameter of at least 0.05 and less than 0.2 μm, a gel content of 30–100% by weight and a bound styrene content of 10–40% by weight and (b) 60–20% by weight of a styrene-butadiene copolymer having a number-average particle diameter of 0.2–3 μm, a gel content of 10–80% by weight and a bound styrene content of 10–40% by weight; the total content of the components (A) and (B) in the rubbery substance is at least 80% by weight; and the difference between the refractive index of the rubbery substance and the refractive index of the copolymer of the monomer mixture grafted on the rubbery substance is 0.005 or less.

15. A process according to claim 14, wherein the graft-polymerization is conducted according to emulsion polymerization, suspension polymerization, bulk polymerization or a combination of two of them.

16. A process according to claim 14, wherein the monomer mixture is added to a latex comprising the components (A) and (B) and then subjected to graft-polymerization.

17. A processs according to claim 16, wherein the addition of the monomer mixture is conducted by adding the whole of the mixture at one time at the start of the graft-polymerization, or by adding it in two or more portions, or by adding a part or the whole of the mixture continuously.

18. A process according to claim 16, wherein the graft-polymerization is conducted at 40° to 100° C. in the presence of a graft polymerization initiator.

19. A process according to claim 18, wherein the graft-polymerization initiator is selected from the group consisting of organic hydroperoxides, redox initiators, persulfates and radical initiators.

* * * * *